United States Patent
Rowse et al.

(10) Patent No.: US 10,412,892 B2
(45) Date of Patent: Sep. 17, 2019

(54) HAY RAKE TOOTH ASSEMBLY

(71) Applicant: Rowse Hydraulic Rakes Co., Inc., Burwell, NE (US)

(72) Inventors: Rodney D. Rowse, O'Neill, NE (US); Randy L. Worden, Burwell, NE (US)

(73) Assignee: Rowse Hydraulic Rakes Co., Inc., Burwell, NE (US)

( * ) Notice: Subject to any disclaimer, the term of this patent is extended or adjusted under 35 U.S.C. 154(b) by 0 days.

(21) Appl. No.: 15/681,610

(22) Filed: Aug. 21, 2017

(65) Prior Publication Data

US 2019/0053432 A1 Feb. 21, 2019

(51) Int. Cl.
*A01D 80/02* (2006.01)
*A01D 7/06* (2006.01)
*A01D 78/08* (2006.01)

(52) U.S. Cl.
CPC .............. *A01D 80/02* (2013.01); *A01D 7/06* (2013.01); *A01D 78/08* (2013.01)

(58) Field of Classification Search
CPC ........ A01D 80/02; A01D 7/06; A01D 78/142; A01D 78/146; A01D 78/08
USPC .............................. 56/400, 400.21, 370–377
See application file for complete search history.

(56) References Cited

U.S. PATENT DOCUMENTS

| | | | |
|---|---|---|---|
| 244,991 A * | 8/1881 | Fox | |
| 2,928,227 A * | 3/1960 | Tuft | A01D 80/00 56/400 |
| 2,932,934 A * | 4/1960 | Payne | A01D 78/04 56/400 |
| 3,157,019 A * | 11/1964 | Brackbill | A01D 80/02 172/705 |
| 3,186,153 A * | 6/1965 | Breed | A01D 80/02 56/400 |
| 3,226,922 A * | 1/1966 | Luther | A01D 80/00 56/400 |
| 3,253,394 A * | 5/1966 | Johnston | A01D 80/02 172/543 |
| 3,401,515 A | 9/1968 | Fishbaugh | |
| 3,643,354 A * | 2/1972 | Clegg | A01G 23/043 111/101 |
| 3,664,107 A * | 5/1972 | Keller | A01D 80/02 56/377 |
| 3,834,140 A * | 9/1974 | Delfino | A01D 80/02 56/400 |
| 4,473,994 A * | 10/1984 | Hein | A01D 80/02 56/400 |
| 4,481,758 A * | 11/1984 | Fishbaugh | A01D 80/02 56/400 |
| 4,745,736 A * | 5/1988 | Copley | A01D 80/02 56/364 |
| 5,566,432 A * | 10/1996 | Perisho | B60T 7/04 24/115 A |
| 5,819,827 A * | 10/1998 | Leonardi | A01G 23/067 144/241 |
| 7,540,139 B2 | 6/2009 | Rowse | |
| 2011/0239606 A1* | 10/2011 | Leiston | A01D 80/02 56/12.4 |
| 2014/0311117 A1 | 10/2014 | Rowse | |

* cited by examiner

*Primary Examiner* — Robert E Pezzuto
(74) *Attorney, Agent, or Firm* — Zarley Law Firm, PLC

(57) ABSTRACT

A hay rake tooth assembly having a base plate. One or more tines that extend through and are captured by one or more holes in the base plate. A molding connected to the base plate and molded about the tine extends.

4 Claims, 5 Drawing Sheets

HAY RAKE TOOTH ASSEMBLY

BACKGROUND OF THE INVENTION

This invention is directed to a hay rake tooth assembly and more particularly a hay rake tooth assembly having a stronger and more resilient construction.

Hay rake assemblies are well-known in the art and typically include a rake wheel having a plurality of tooth assemblies mounted to the wheel. An example of a conventional hay rake tooth is found in U.S. Pat. No. 3,401,515. As shown in FIG. 1, prior art tooth assemblies 1 include a base plate 2, a rubber molding 3 attached to the base plate 2, and a tine 4 that extends from within the rubber molding 3 outwardly away from the base plate 2. Some tines 4 are configured at a base end 5 to have an L-shape or a loop to reduce the possibility of the tine 4 being pulled out of the molding 3.

With this prior art design, when the tine 4 is molded and is held in place by hole 6 which is made near the base of the molding on each side, that is in communication with the bore 7 in the molding 3 that receives a pin to hold the tine 4. However, the hole 6 weakens the structural integrity of molding 3. Further, since the tine 4 is retained only by the molding 3, when the molding fatigues, or is stressed beyond its limitations, the molding 3 breaks and the tine 4 is released into the field where the tine 4 can puncture an implement tire, be run through a field chopper, or interfere with production in some other way. Accordingly, a need exists in the art for a tooth assembly that addresses these needs.

Therefore, an objective of the present invention is to provide a tooth assembly that is stronger and more resilient.

Another objective of the present invention is to provide a tooth assembly that better retains a tine 4 under stress or fatigue.

These and other objectives will be apparent to one skilled in the art based upon the following written description, claims, and drawings.

SUMMARY OF THE INVENTION

A hay rake tooth assembly having an elongated base plate having one or more holes that are preferably swedged or cupped. Tines having a finger section and a head section that are inserted through the holes in the base plate such that the head section of the tine is captured and retained by the base plate.

A molding is formed about the tine and attached to the base plate.

DETAILED DESCRIPTION OF THE PREFERRED EMBODIMENT

Figure 1:
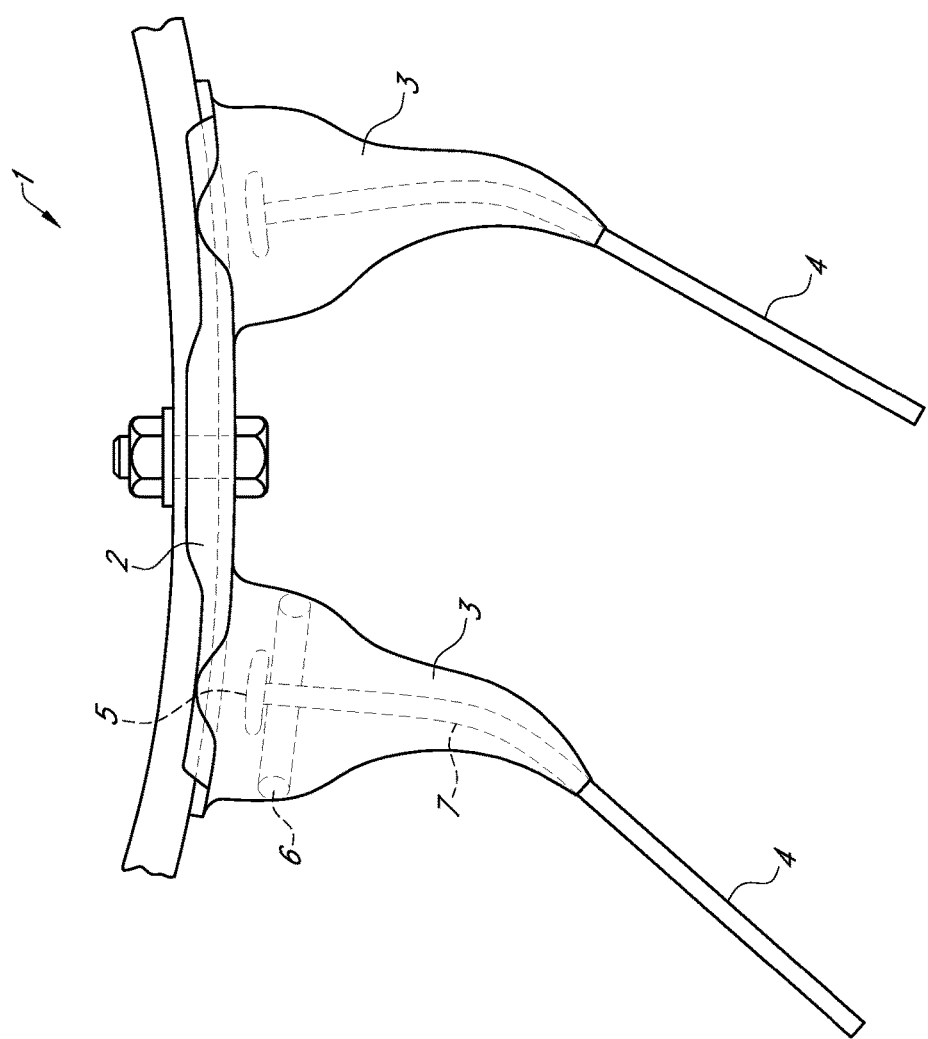
FIG. 1 is a side sectional view of a prior art tooth assembly.
Figure 2:
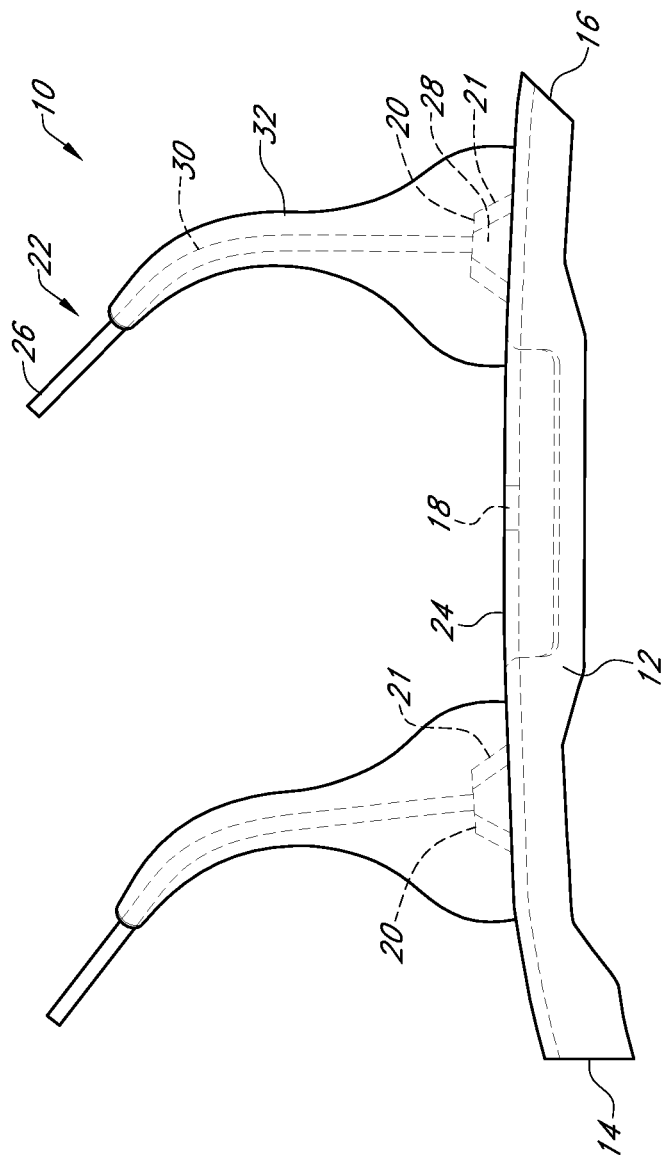
FIG. 2 is a side sectional view of a tooth assembly.
Figure 3:
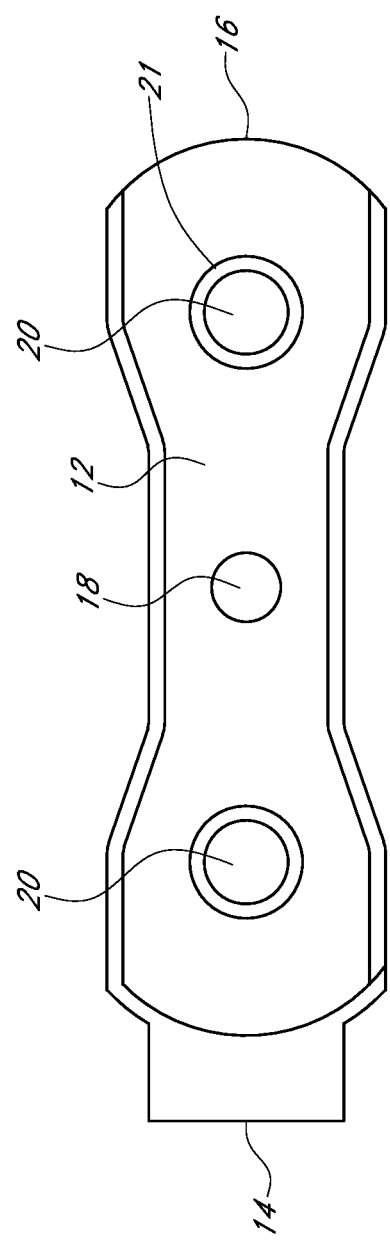
FIG. 3 is a top plan view of a base plate.
Figure 4:
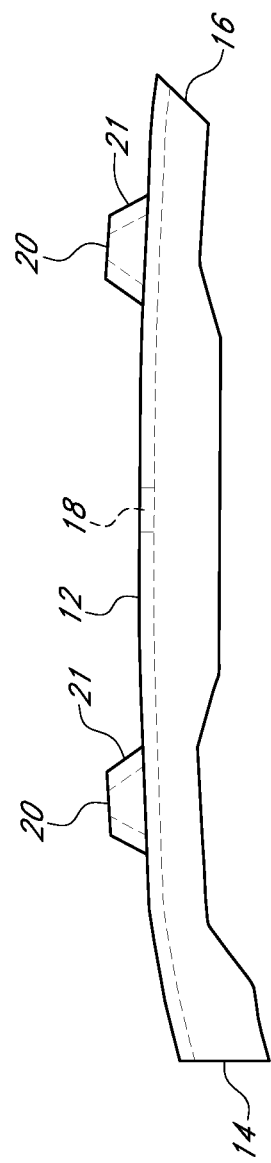
FIG. 4 is a side view of a base plate.
Figure 5:
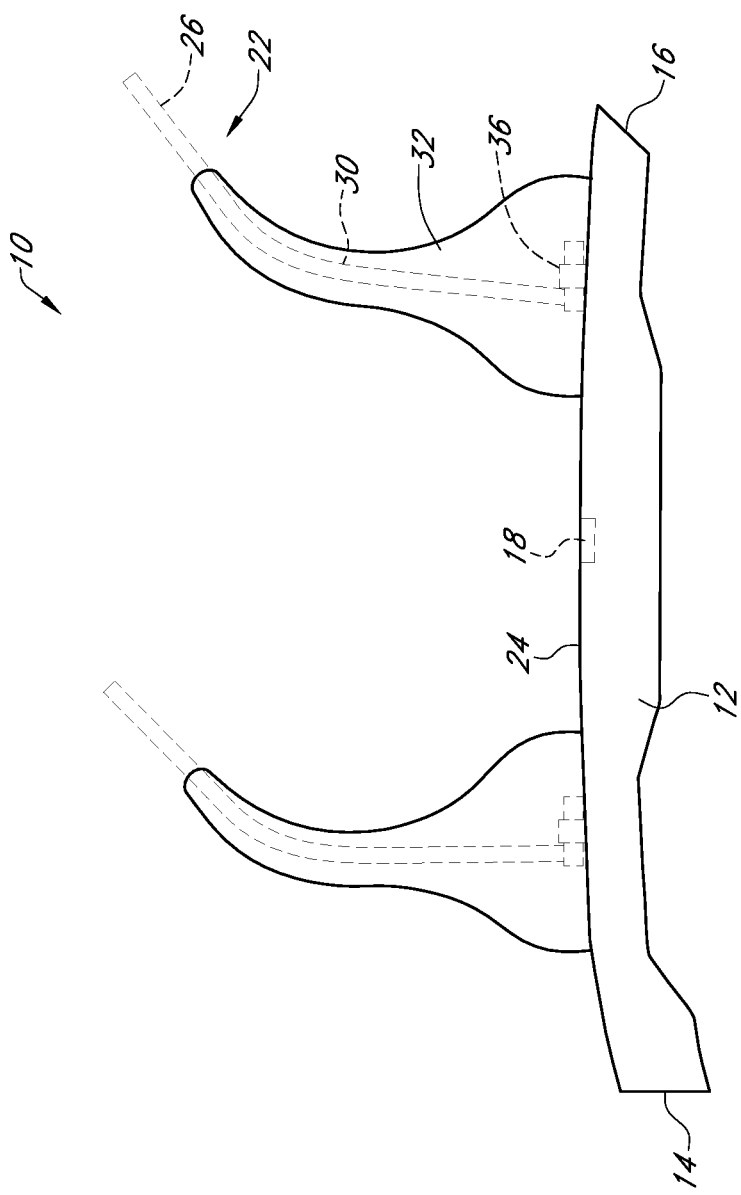
FIG. 5 is a side sectional view of a tooth assembly.

Referring to the Figures, a hay rake tooth assembly 10 has a base plate 12 that is secured to a raking wheel (not shown). The base plate 12 is an elongated member having a first end 14, a second end 16, and a connecting hole 18 about halfway between the ends 14 and 16. The connecting hole 18 receives a bolt or the like to connect the base plate 12 to the wheel.

Positioned between the ends 14 and 16 and the connecting hole 18 are a pair of holes 20 for receiving tines 22. Preferably, the holes 20 are swedged or cupped upwardly 21 away from a top surface 24 of the base plate 12.

The tines 22 have a finger section 26 that extends away from the head section 28. The head section 28 is greater in diameter than the finger section 26 and preferably is conical in shape or swedged so that the finger section 26 will extend through the hole 20 while the head section 28 is captured by and engages the swedge portion of base plate 22. A molding 32, which totally encloses the tine 22 with no positioning holes to weaken the molding 32, is formed about the tine connected to the base plate 12.

Once assembled, the tines 22 are able to move adequately to perform their intended function while being secured to the base plate 12. If the molding 32 were to fail, the base plate 12 would still retain the tines 22.

In an alternative embodiment, instead of holes 20, the base plate 12 has a connecting member 34 such as a loop or the like. The head section 28 of the tine 22 would also have a connecting member 36 that would connect and/or interlock the base plate 12 and the tine 22.

Accordingly, a tooth assembly 10 has been disclosed that, at the very least, meets all the stated objectives.

What is claimed is:

1. A hay rake tooth assembly, comprising:
   a base plate having an elongated member with a pair of holes;
   a tine having a finger section and a head section, wherein the head section has a larger diameter than the finger section such that the finger section of the tine extends through a swedged portion of one of a pair of holes in the base plate and the head section is captured by the swedged portion of one of the pair of holes in the base plate; and
   a molding connected to the base plate and molded about the tine.

2. The assembly of claim 1 wherein the base plate has the pair of holes and at least one hole of the pair of holes is between the connecting hole and an end of the elongated member.

3. The assembly of claim 1 wherein the head section is conical in shape.

4. A hay rake tooth assembly, comprising:
   a base plate having an elongated member with at least one hole positioned between a first end and a second end of the base plate;
   the at least one hole having a swedged portion formed and extending upwardly from a top surface of the base plate, wherein the swedged portion has a conical shape;
   a tine having a finger section and a head section, wherein the head section has a larger diameter than the finger section such that the finger section of the tine extends through the swedged portion and the head section is captured by the conical shape of the swedged portion; and
   a molding connected to the base plate and molded about the tine.

* * * * *